3,046,241
COMPOSITION COMPRISING AN ALUMINUM ALKOXIDE AND A MIXTURE OF SILOXANES

John W. Gilkey, Midland, Mich., assignor to Dow Corning Corporation, Midland, Mich., a corporation of Michigan
No Drawing. Filed Aug. 24, 1960, Ser. No. 51,545
2 Claims. (Cl. 260—29.1)

This invention relates to a new composition which contains organic aluminates and is useful for rendering leather water repellent.

Certain organosilicon compositions containing titanium esters or zirconium esters are well known for rendering leather water repellent. The primary object of this invention is to provide another type of organosilicon composition for rendering leather water repellent. Another object is to provide such a composition employing aluminum esters. Other objects and advantages will be apparent from the following description.

This invention relates to a composition of matter consisting essentially of a mixture of (1) from 2 to 50 percent by weight of an aluminum compound of the formula $Al(OR)_3$ or partial hydrolyzates thereof, in which each R is an aliphatic monovalent hydrocarbon radical of less than 13 carbon atoms or an hydroxylated aliphatic monovalent hydrocarbon radical of less than 13 carbon atoms and containing less than 4 hydroxyl radicals, (2) from 5 to 70 percent by weight of a methylpolysiloxane resin composed of trimethylsiloxane units and $SiO_2$ units in such proportion that the ratio of methyl to silicon ratio ranges from about 0.8:1 to about 1.5:1, and (3) from 15 to 80 percent by weight of a polysiloxane composed essentially of units of the formula $$Z_nSiO_{\frac{4-n}{2}}$$

in which each Z is a monovalent hydrocarbon radical of less than 7 carbon atoms, each $n$ has a value of from 1 to 3 and $n$ has an average value of from 2 to 2.9.

The aluminate esters suitable for employment in the compositions of this invention are those esters having the general formula $Al(OR)_3$ in which each R can be any aliphatic monovalent hydrocarbon radical of less than 13 carbon atoms, any hydroxylated aliphatic, monovalent hydrocarbon radical of less than 13 carbon atoms and containing less than 4 hydroxyl radicals or any partially hydrolyzed derivatives thereof which are soluble in hydrocarbon or halogenated hydrocarbon solvents. More specifically, R can be, for example, a methyl, ethyl, isopropyl, allyl, t-butyl, hexyl, hexenyl, 2-ethylhexyl, dodecyl, gamma-hydroxypropyl, gamma-hydroxybutyl, 2-hyroxy-1,1,2-trimethylpropyl, omega-hydroxyoctyl, 4-hydroxy-2-butenyl, 2,3-dihydroxy-1-methylpentyl or 3,4-dihydroxy-1-methylbutyl radical. Preferably, the R groups should have at least 3 carbon atoms and, more preferably, from 4 to 8 carbon atoms.

The aluminum esters can be prepared directly by the addition of an excess of the desired alcohol to a solution in benzene or other appropriate solvent of aluminum chloride, followed by precipitation of ammonium chloride with dry ammonia, filtration of the liquid and distillation of the product from the solvent or vice versa depending on the boiling points of the solvent and product. The preferred esters can be prepared most easily by transesterification reactions with commercially-available isopropyl aluminate (also called aluminum isopropoxide), i.e. heating this aluminate with at least the stoichiometric quantity of higher boiling alcohol and distilling off the liberated isopropanol. Partially hydrolyzed $Al(OR)_3$ compounds can be employed if the hydrolysis has not rendered the compounds insoluble in hydrocarbon solvents or halogenated hydrocarbon solvents such as, for example, toluene, benzene, xylene, petroleum hydrocarbons, Stoddard solvent, naphtha mineral spirits, perchloroethylene, methylene chloride or the like.

The compositions and proportions of ingredients (2) and (3) in the method of this invention are well-known in the art. The methylpolysiloxane resins (2) which are employed herein are composed essentially of trimethylsiloxane units and $SiO_2$ units but may contain traces of dimethylsiloxane units and/or monomethylsiloxane units. These copolymers may be prepared by cohydrolyzing $Me_3SiX$ and $SiX_4$ where X is a hydrolyzable radical. Another method by which these materials may be prepared is that of reacting the methylchlorosilanes, methylalkoxysilanes or hexamethyldisiloxane with an acidic silica sol. Regardless of the method employed the ratio of methyl radicals to silicon radicals in the copolymer must be from 0.8:1 to 1.5:1 with the preferred range being from about 1:1 to about 1.3:1.

Organopolysiloxanes (3) which are operative herein include those in which Z is any monovalent hydrocarbon radical having less than 7 carbon atoms such as, for example, the phenyl, methyl, ethyl, propyl, vinyl, allyl, cyclohexyl, cyclopentenyl and t-butyl radicals. Consequently specific examples of operative siloxanes (3) are dimethylsiloxane, vinylmethylsiloxane, vinylethylsiloxane, dipropylsiloxane, phenylmethylsiloxane, or any mixtures thereof and copolymers of any of these diorganosiloxanes with triorganosiloxanes such as, for example, trimethylsiloxane, phenyldimethylsiloxane, vinyldimethylsiloxane, hexenyldiethylsiloxane and amyldimethylsiloxane. Monoorganosiloxane units can also be present in these siloxanes so long as the value of $n$ remains substantially in the range specified.

The organosiloxanes (3) are benzene-soluble materials which can vary in viscosity from thin fluids to deformable solids. Generally fluid polymers having a viscosity ranging from 5 to 100,000 cs. at 25° C. are preferred.

It is desirable to include in the compositions of this invention an additional ingredient (4) which can be a beta-diketone such as $$R\overset{O}{\overset{\|}{C}}CH_2\overset{O}{\overset{\|}{C}}R \text{ or } R\overset{O}{\overset{\|}{C}}CHR\overset{O}{\overset{\|}{C}}R$$

or a beta-ketoester such as $$R\overset{O}{\overset{\|}{C}}CH_2\overset{O}{\overset{\|}{C}}OR \text{ or } R\overset{O}{\overset{\|}{C}}CHR\overset{O}{\overset{\|}{C}}OR$$

in which R is as above defined. This ingredient is added in an amount equal to at least 0.75 mol of (4) per mol of aluminum in compound (1). No more than about 3 mols of (4) per mol of aluminum in compound (1) is useful although 5 mols or more of (4) per mol of aluminum is not detrimental. Ingredient (4) can be mixed simultaneously with ingredients (1), (2) and (3) or can be premixed with compound (1). Apparently, (4) reacts with (1) in any case.

The compositions of this invention are prepared by merely mixing ingredients (1), (2), (3) and optionally (4). The mixing can be accomplished either with the essentially undiluted materials or by employing a common solvent such as those specified above.

One of the primary uses of the compositions of this invention is that of rendering leather water repellent. This is accomplished preferably by employing a solvent solution of the siloxane using any solvents which are harmless to leather such as those specified above. The leather may be treated in any suitable manner such as by spraying, dipping or padding. Suitable results are obtained when the leather contains from .5 to 50% by weight of the siloxane compositions. In general 2 to 25% by weight is preferred. Ordinarily, one application with a 15% solution of the composition of this invention in perchloroethylene is sufficient to give the desired pickup.

The compositions of this invention improve the water repellency of any leather either tanned, tawed or otherwise cured and either finished or unfinished leather. They are applicable to leather from any type of animal such as horsehide, pigskin, kid, cowhide and the like.

Furthermore, leather treated with the compositions of this invention including ingredient (4) can be finished in the conventional manner with standard commercially-available organic finishes more readily than leather treated with the compositions of this invention which do not include ingredient (4).

The compositions of this invention are also useful as water repellent agents for glass surfaces, ceramic surfaces, wood surfaces and textiles.

The following examples illustrate the best method of using the compositions of this invention. These examples should not be construed as limiting this invention, the scope of which is properly delineated in the claims.

A measure of the water resistance of the leather is obtained by flexing the treated material on a Dow Corning Corporation Sylflex leather tester machine while immersed in water as described in "Industrial Laboratories," July 1955, page 94. It has been found that leather to be commercially acceptable must withstand 4,000 flexes or must absorb less than 15 percent by weight water after 4,000 flexes if it cannot withstand 4,000 flexes. Due to the variation in leather from sample to sample, an average of several samples is taken in testing for commercial control.

EXAMPLE 1

In this example the methylpolysiloxane resin A corresponding to ingredient (2) was a copolymer of trimethylsiloxane units and $SiO_2$ units having a methyl-to-silicon ratio of about 1.2:1. Siloxane B corresponding to ingredient (3) was a trimethylsiloxy-endblocked dimethylpolysiloxane fluid having a viscosity at 25° C. of 350 cs. Compound C corresponding to ingredient (4) was ethyl acetoacetate.

Solutions were prepared in the proportions shown below dissolved in perchloroethylene to give 15 percent by weight solution of the base composition of ingredients (1), (2) and (3). Cowhide samples were dipped into the respective solutions, were allowed to become saturated, were removed and air-dried at least 48 hours. The amount of solids picked up was calculated as percent by weight solids based on the weight of the leather. The leather samples were then tested for water resistance on the Dow Corning Sylflex leather tester with the following results.

*Table*

| Base Composition | | | | Mols of C per mol of Al in (1) | Average percent pickup | Average flexes | Percent H₂O Adsorp. |
|---|---|---|---|---|---|---|---|
| Ingredient (1) | Percent (1) | Percent A | Percent B | | | | |
| 2-ethylhexylaluminate | 33.3 | 33.3 | 33.3 | 2 | 17.9 | >37,000 | |
| Do | 33.3 | 33.3 | 33.3 | 1 | 18.7 | >18,000 | |
| Do | 3.6 | 48.2 | 48.2 | 4.9 | 19.6 | >8,000 | |
| Do | 33.3 | 33.3 | 33.3 | | 18.4 | 1,268 | 8.1 |
| Do | 33.3 | 33.3 | 33.3 | | 15.9 | 1,835 | 10.1 |
| n-octylaluminate | 33.3 | 33.3 | 33.3 | 1 | 15.0 | >8,000 | |

EXAMPLE 2

Equivalent results are obtained when the following compounds are substituted for the ethyl acetoacetate employed in Example 1.

$$CH_3\overset{O}{\overset{\|}{C}}CH(C_2H_5)\overset{O}{\overset{\|}{C}}CH_3$$

$$CH_3\overset{O}{\overset{\|}{C}}CH(CH_3)\overset{O}{\overset{\|}{C}}OC_2H_5$$

$$C_4H_7\overset{O}{\overset{\|}{C}}CH_2\overset{O}{\overset{\|}{C}}CH_3$$

$$C_6H_{11}\overset{O}{\overset{\|}{C}}CH_2\overset{O}{\overset{\|}{C}}OC_6H_{11}$$

EXAMPLE 3

Equivalent results are obtained when the following siloxanes are substituted for siloxane B in Example 1:

A copolymer of 75 mol percent dimethylsiloxane and 25 mol percent phenylmethylsiloxane,
Vinylmethylsiloxane,
Diethylsiloxane,
Butylmethylsiloxane,
Allylmethylsiloxane,
A copolymer of vinyldimethylsiloxane and dimethylsiloxane, and
A copolymer of phenyldimethylsiloxane and dimethylsiloxane.

EXAMPLE 4

Equivalent results are obtained when butyl aluminate, 1-methylpentyl aluminate, 3-isopropyl-5-methylhexyl aluminate, 4,4-dipropylbutyl aluminate and 2,3-dihydroxy-1-methylpentyl aluminate are substituted for the 2-ethylhexyl aluminate employed in Example 1.

That which is claimed is:

1. A composition of matter consisting essentially of a mixture of (1) from 2 to 50 percent by weight of an aluminum compound selected from the group consisting of compounds of the formula $Al(OR)_3$ and partial hydrolyzates thereof, in which each R is selected from the group consisting of aliphatic monovalent hydrocarbon radicals of less than 13 carbon atoms and hydroxylated aliphatic monovalent hydrocarbon radicals of less than 13 carbon atoms and containing less than 4 hydroxyl radicals, (2) from 5 to 70 percent by weight of a methylpolysiloxane resin composed of trimethylsiloxane units and $SiO_2$ units in such proportion that the ratio of methyl radicals to silicon atoms ranges from about 0.8:1 to about 1.5:1, and (3) from 15 to 80 percent by weight of a polysiloxane composed essentially of units of the formula $$Z_nSiO_{\frac{4-n}{2}}$$

in which each Z is a monovalent hydrocarbon radical of less than 7 carbon atoms, each $n$ has a value of from 1 to 3 and $n$ has an average value of from 2 to 2.9.

2. The composition of claim 1 with as an additional ingredient (4) a compound selected from the group consisting of beta-diketones of the formulas $$R\overset{O}{\overset{\|}{C}}CH_2\overset{O}{\overset{\|}{C}}R$$

and $$R\overset{O}{\overset{\|}{C}}CHR\overset{O}{\overset{\|}{C}}R$$

and beta-ketoesters of the formulae $$R\overset{O}{\overset{\|}{C}}CH_2\overset{O}{\overset{\|}{C}}OR$$

and $$R\overset{O}{\overset{\|}{C}}CHR\overset{O}{\overset{\|}{C}}OR$$

in which each R is as above defined, said compound (4) being added in an amount equal to at least 0.75 mol of (4) per mol of aluminum in compound (1).

References Cited in the file of this patent

UNITED STATES PATENTS

| | | |
|---|---|---|
| 2,635,055 | Figdor | Apr. 14, 1953 |
| 2,772,988 | Plapper et al. | Dec. 4, 1956 |
| 2,868,750 | Gilkey | Jan. 13, 1959 |
| 2,884,393 | Gilkey | Apr. 28, 1959 |
| 2,977,249 | Heyden et al. | Mar. 28, 1961 |